(12) United States Patent
Forster (10) Patent No.: US 6,456,225 B1
(45) Date of Patent: Sep. 24, 2002

(54) REFLECTOR CIRCUIT

(75) Inventor: Ian J Forster, Chelmsford (GB)

(73) Assignee: Marconi Caswell Limited, Stanmore (GB)

( * ) Notice: Subject to any disclaimer, the term of this patent is extended or adjusted under 35 U.S.C. 154(b) by 0 days.

(21) Appl. No.: 09/674,119

(22) PCT Filed: Apr. 23, 1999

(86) PCT No.: PCT/GB99/01249

§ 371 (c)(1),
(2), (4) Date: Jan. 3, 2000

(87) PCT Pub. No.: WO99/56148

PCT Pub. Date: Nov. 4, 1999

(30) Foreign Application Priority Data

Apr. 25, 1998 (GB) .............................................. 9808762

(51) Int. Cl.⁷ ............................. H01Q 15/00; G01S 7/38
(52) U.S. Cl. ................................. 342/12; 342/5; 342/6; 342/13; 342/14; 342/15; 342/175; 342/187
(58) Field of Search ........................... 342/5–16, 42–51, 342/175, 187

(56) References Cited

U.S. PATENT DOCUMENTS

| 4,059,831 A | 11/1977 | Epstein |
| 4,218,680 A | 8/1980 | Kennedy |
| 4,350,982 A | 9/1982 | Alpers |
| 4,358,763 A | * 11/1982 | Strauch ........................ 342/51 |
| 5,129,867 A | 7/1992 | Schrack |
| 5,530,451 A | 6/1996 | Richardson |
| 5,579,008 A | * 11/1996 | Hulderman et al. .......... 342/44 |

FOREIGN PATENT DOCUMENTS

| GB | 2 051 522 A | 1/1981 |
| GB | 2 274 374 A | 7/1994 |
| GB | 2 284 323 A | 5/1995 |
| RU | 2070727 C1 | 12/1996 |
| WO | WO 99/56148 A1 | 11/1999 |

OTHER PUBLICATIONS

Analog Signal Processing with Microwave Magnetics, J. D. Adam, Proceedings of the IEEE, vol. 76, No. 2, Feb. 1999, pp. 159–169.

* cited by examiner

Primary Examiner—Bernarr E. Gregory
(74) Attorney, Agent, or Firm—Kirschstein, et al.

(57) ABSTRACT

A reflector circuit is provided which responds to illuminating radiation with corresponding output radiation of increased magnitude relative to the illuminating radiation, while also providing a frequency selective limiting characteristic. The circuit comprises an antenna for receiving the illuminating radiation and emitting the corresponding output radiation, a delay line providing a frequency selective limiting and signal storage characteristic and an amplifier assembly. The antenna provides an input signal upon receipt of the illuminating radiation, a portion of which is amplified, frequency selectively filtered and then stored for a period after which it is emitted as the output radiation from the circuit. Switches are incorporated and are operable to counteract spontaneous oscillation within the circuit.

11 Claims, 5 Drawing Sheets

REFLECTOR CIRCUIT

BACKGROUND OF THE INVENTION

This invention relates to a reflector circuit for receiving illuminating radiation and emitting corresponding amplified output radiation in response; the invention is particularly, although not exclusively, concerned with a reflector circuit for use in a pseudo passive transponder (PPT) tag.

One type of reflector circuit known in the prior art, namely a conventional PPT, uses a diode detector to detect incoming radiation from an interrogating source. The diode can be operated as a modulated reflector by modulating a bias potential applied thereto with an information carrying signal such that the PPT reflects the incoming radiation back to the source as modulated reflected radiation. Since the conventional PPT does not incorporate an amplifier in association with the diode, the reflected radiation is of reduced amplitude with respect to the incoming radiation; this limits a useful range over which the PPT can respond for a given radiation output power from the interrogating source, namely carrier radiation power emitted from the source. The PPT responds to the incoming radiation by emitting corresponding reflected radiation with an efficiency referred to as its "conversion efficiency". This conversion efficiency is defined as a ratio of the carrier radiation power received by the PPT to sideband radiation power of the corresponding reflected radiation emitted from the PPT. For the conventional PPT described above, the conversion efficiency is typically –8dB or less which necessitates use of a radiation output power from the interrogating source of tens of milliwatts to achieve a useful operating range from the source to the PPT of a few meters. Such a short operating range is undesirable in many applications. It is often impermissible to increase the radiation output power from the source, for example for safety reasons. Moreover, general background radiation giving rise to receiver noise at the source limits its sensitivity for detecting reflected radiation from the conventional PPT.

Another type of reflector circuit, namely a pseudo continuous wave radar transponder as described in a UK patent number GB 2 051 522A, incorporates an antenna assembly and a transmission radio frequency (r.f.) amplifier for enhancing its conversion efficiency and thereby providing it with an extended operating range. Since it is difficult to prevent an r.f. amplifier coupled to an antenna assembly for receiving incoming radiation and emitting corresponding amplified output radiation from spontaneously oscillating, the pseudo transponder additionally incorporates a delay line and associated switches controlled from a clock generator to counteract spontaneous oscillations. Spontaneous oscillation is defined as unwanted oscillations occurring within a signal path providing amplification by virtue of residual feedback arising around the path. Incoming radiation is received at the antenna assembly and converted thereat to a received signal which is then sampled by one of the switches, amplified by the amplifier, stored in the delay line for a period of time, further amplified by the amplifier before finally being emitted as reflected radiation from the antenna assembly. Incorporation of the switches and delay line assists to counteract spontaneous oscillations arising in the amplifier.

The inventor of the present invention has appreciated that a problem arises when the pseudo transponder described in the foregoing is simultaneously interrogated by several sources operating at mutually different radiation emission frequencies, one of which provides sufficient incoming radiation at the transponder to cause its r.f. amplifier to obscure or distort signals transmitted therethrough, namely to cause overload in the amplifier or cause generation of intermodulation artefacts. Such overload can obscure relatively weaker incoming radiation received at the transponder which is itself insufficiently powerful to cause overload in the transponder, thereby potentially preventing the pseudo transponder from responding to the weaker radiation.

A conventional solution to the problem above is to incorporate a gain control in association with the r.f. amplifier to reduce its amplification when overload occurs. When relatively weaker signals are received by the pseudo transponder, the control is arranged so that the amplifier transmits and amplifies signals by a nominal gain. When received radiation at the transponder is sufficiently powerful to cause overload within the amplifier when providing its nominal gain, the control is arranged to reduce amplifier gain to counteract such overload. Such gain reduction is undesirable because it reduces amplification proportionately at all frequencies to which the transponder is responsive. Thus, weaker radiation received at the transponder at a first frequency is amplified with less than the nominal gain when stronger radiation at a second frequency is simultaneously received thereat which causes the gain control to reduce gain provided by the r.f. amplifier.

The conventional solution is unsatisfactory when the transponder is interrogated simultaneously by several sources, one of which is remote and provides weaker radiation at the transponder and other of which is close and provides stronger radiation thereat sufficiently powerful to cause amplifier overload when providing nominal gain. It is desirable that the transponder responds to the weaker radiation and the stronger radiation using the nominal gain and reduced gain respectively.

SUMMARY OF THE INVENTION

According to the present invention, there is provided a reflector circuit for receiving illuminating radiation and emitting corresponding amplified output radiation, the circuit comprising an antenna assembly for receiving the illuminating radiation and providing a corresponding received signal, and processing means for amplifying and storing a portion of the received signal for a period of time for use in generating a corresponding output signal for emission from the antenna assembly as the output radiation, in which the processing means is arranged to provide frequency selective amplification in response to the magnitude of components present in the input radiation.

This provides the advantage that the circuit is capable of modifying its response at frequencies where the illuminating radiation is sufficiently powerful to cause overload, thereby counteracting overload at those frequencies whilst providing an unmodified response to illuminating radiation at frequencies where there is insufficient illuminating radiation power received at the circuit to cause overload therein.

If the circuit responds non-progressively when the magnitude of components in the illuminating radiation exceeds a threshold power level at which the circuit selectively modifies its response to counteract overload or provide compression, a problem arises. The circuit can therefore be arranged to provide amplification which progressively reduces in response to increased magnitude of components in the illuminating radiation. This provides an advantage that spurious circuit response is less likely to occur when the magnitude of components in the illuminating radiation is substantially similar to the threshold power level.

In one embodiment of the invention, the processing means can incorporate storing means for storing the portion of the signal for use in generating the output signal, the storing means incorporating a magnetostatic wave device arranged to provide a frequency selective response. This provides an advantage that the device simultaneously provides a storing function and a frequency selective response, thereby providing a simplified reflector circuit. Operation of magnetostatic wave devices will be further described later.

Advantageously, the magnetostatic device provides a signal propagation path through an epitaxial Yttrium Iron Garnet magnetic film having a thickness in a range of 10 μm to 100 μm for storing the portion of the signal and providing the frequency selective response. This provides an advantage of being an inexpensive and compact manner to provide the selective response.

When the circuit is used in applications where compactness is paramount, it is preferable that the circuit consumes relatively low power, thereby reducing a requirement for a bulky power supply or such a large battery for operating the circuit. The circuit can therefore incorporate a reflection amplifier for amplifying the portion of the received signal. Moreover, the storing means can be connected in a signal path between the antenna assembly and the reflection amplifier. This provides an advantage that the reflection amplifier is capable of providing a relatively high gain, for example in a range +10 to 30 dB, whilst consuming relatively low currents, for example a few microamperes.

Wideband reflection amplifiers providing gain and a response bandwidth of several GHz are capable of spontaneously oscillating, especially if they are imperfectly electrically matched to components connected thereto. The circuit advantageously therefore incorporates gain controlling means for switching the reflection amplifier in the reflector circuit alternately between a relatively more reflecting state and a relatively less reflecting state. This provides an advantage that gain provided by the amplifier is interruptible thereby counteracting a tendency for the amplifier to spontaneously oscillate.

Conveniently, the antenna assembly comprises a first antenna element for receiving the input radiation and a second antenna element for emitting the output radiation, said first and second antenna elements being mutually spatially separate. This provides an advantage that input and output from the circuit are isolated to a greater degree, thereby counteracting spontaneous oscillation within the circuit.

The antenna assembly preferably incorporates one or more of a patch antenna, a bow tie dipole antenna and a travelling wave antenna. These provide an advantage of being compact and suitable for use in various combinations at radio frequencies in a frequency range of several GHz.

BRIEF DESCRIPTION OF THE DRAWINGS

Embodiments of the invention will now be described, by way of example only, with reference to the following diagrams in which.

DETAILED DESCRIPTION OF THE PREFERRED EMBODIMENTS

Figure 1:
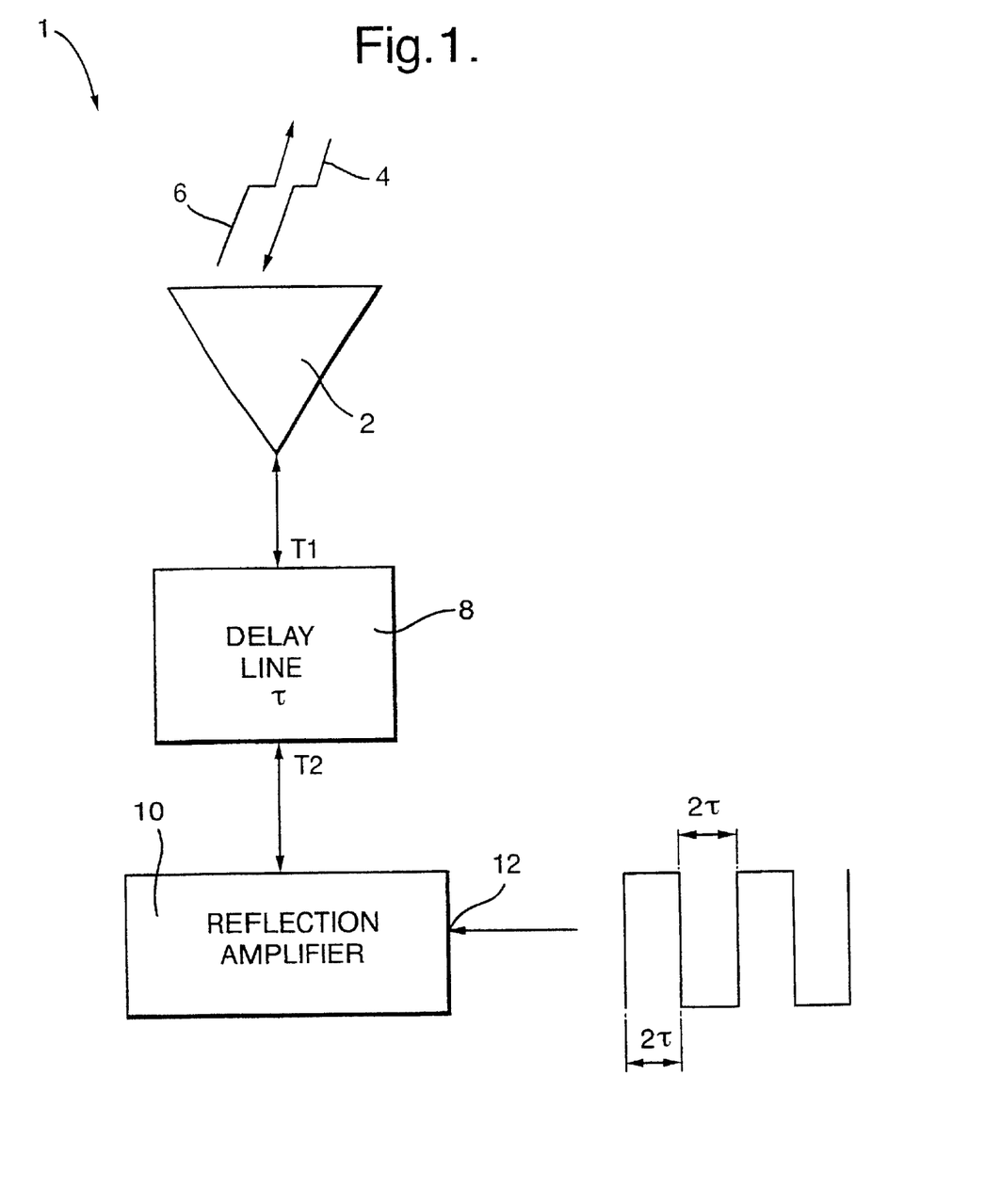
FIG. 1 is a schematic of a reflector circuit in accordance with a first embodiment of the invention.

Referring to FIG. 1, a reflector circuit for operation at microwave frequencies, for example in a frequency range of 1 GHz to 4 GHz although operation at other frequencies is possible, is indicated generally by 1. The circuit 1 comprises an antenna 2 for receiving continuous wave illuminating radiation 4 and for emitting output radiation 6. The antenna 2 is connected to a delay line 8 which is in turn connected to a reflection amplifier 10. The delay line 8 is operable such that it delays a signal passing therethrough by a time period τ. The antenna 2 can comprise one or more of a patch antenna, a bow tie dipole antenna, a resistively loaded travelling wave antenna or any broadband antenna suitable for operation in the described frequency range.

Operation of the circuit 1 will now be described with reference to FIG. 1. In an initial state, namely t=0, the illuminating radiation 4 is incident on the circuit 1 and the reflection amplifier 10 has just switched to a reflecting state in which it provides reflective amplification. The radiation 4 is received by the antenna 2 which converts it to an input signal which passes into the delay line 8 through which it propagates as a wave for a time period τ after which it is output therefrom at a time t=τ as a delayed signal to reach the reflection amplifier 10. At the time t=τ, the reflection amplifier 10 remains in its reflecting/amplifying state and consequently reflects and amplifies the delayed signal as a reflected signal which propagates back through the delay line 8 to the antenna 2 to be emitted as the output radiation 6. At a time t=2τ when the start of the reflected signal reaches the antenna 2 for emission therefrom, the reflection amplifier 10 is switched to a relatively less reflecting state where it provides insufficient amplification for supporting spontaneous oscillation within the circuit 1.

The delay line 8 is a magnetostatic wave delay line (MWDL) which provides highly advantageous signal processing functions due to its non-linear and frequency selective signal transmission characteristics. Although the delay line 8 is a broadband device, with a typically 1 GHz passband between frequencies of 2 and 3 GHz, it exhibits a narrowband limiting characteristic dependent on materials employed for its fabrication.

The delay line 8 provides a signal propagation path through a magnetic medium, namely through a magnetic film of epitaxially deposited Yttrium Iron Garnet (YIG), on an alumina or sapphire substrate, the film having a film thickness in a range of 10 μm to 100 μm. The delay line 8 further incorporates transducers for coupling signals applied to the delay line 8 to generate corresponding magnetic waves propagating along the film, and for coupling waves in the film to generate corresponding delayed signals for output from the delay line 8. The delay line 8 further comprises a magnet for applying a magnetic field to the film for aligning magnetic dipoles therein during its operation, namely for creating magnetic anisotropy in the film.

The delay line 8 provides a signal limiting transmission characteristic when signals having a relatively increased amplitude are applied thereto; limiting is defined as dynamic attenuation which is responsive to signal amplitude. Limiting occurs when at a given input signal power into the delay line 8, further increase of the input power does not give rise to a corresponding increase in output signal power therefrom; for example, a 3 dB increase in input power results in a corresponding 1 dB increase in output power when limiting occurs. Limiting thus occurs progressively in the delay line 8 in relation to input signal power applied thereto when the input signal power exceeds a limiting threshold power level.

However, limiting in the delay line 8 is different from that which occurs in a diode limiter for example. In the case of a diode limiter, the limiter responds to total power in an input signal over its bandwidth applied thereto. Thus a relatively stronger first component of an input signal applied to the diode limiter which is 10 dB above its limiting threshold will, for example, be attenuated by an extra 10 dB, but a simultaneously present relatively smaller second component of the input signal but at a different frequency in the passband of the limiter relative to the first component will also be correspondingly attenuated by the extra 10 dB.

The delay line 8 functions in a different manner compared to the diode limiter described above; the delay line 8 independently limits components in an input signal applied thereto and propagating therethrough whose frequencies are more than a few MHz apart. This means that a stronger signal component at a first frequency in the input signal will be limited to a known level by attenuation thereof without causing corresponding attenuation of a weaker signal component at a second frequency in the input signal, the first and second frequencies being mutually different.

In the circuit 1, the reflection amplifier 10 comprises a field effect transistor (FET), namely a silicon JFET on a GaAs device, selected to suit an operating frequency range over which the reflector circuit 1 is to operate. As described in our UK Patent Number GB 2 284 323B, which corresponds to U.S. Pat. No. 5,822,685, the transistor is configured by means of a feedback arrangement such as to operate within a linear region of its current/voltage characteristic such that it reflects a signal received thereat with an increased magnitude. In this mode of operation, the transistor behaves as a negative resistance. By further operating the transistor in a non-linear relatively lower gain region of its current/voltage characteristics, it is capable of finctioning as a detector for detecting modulation conveyed in the signal applied thereto.

Figure 2:
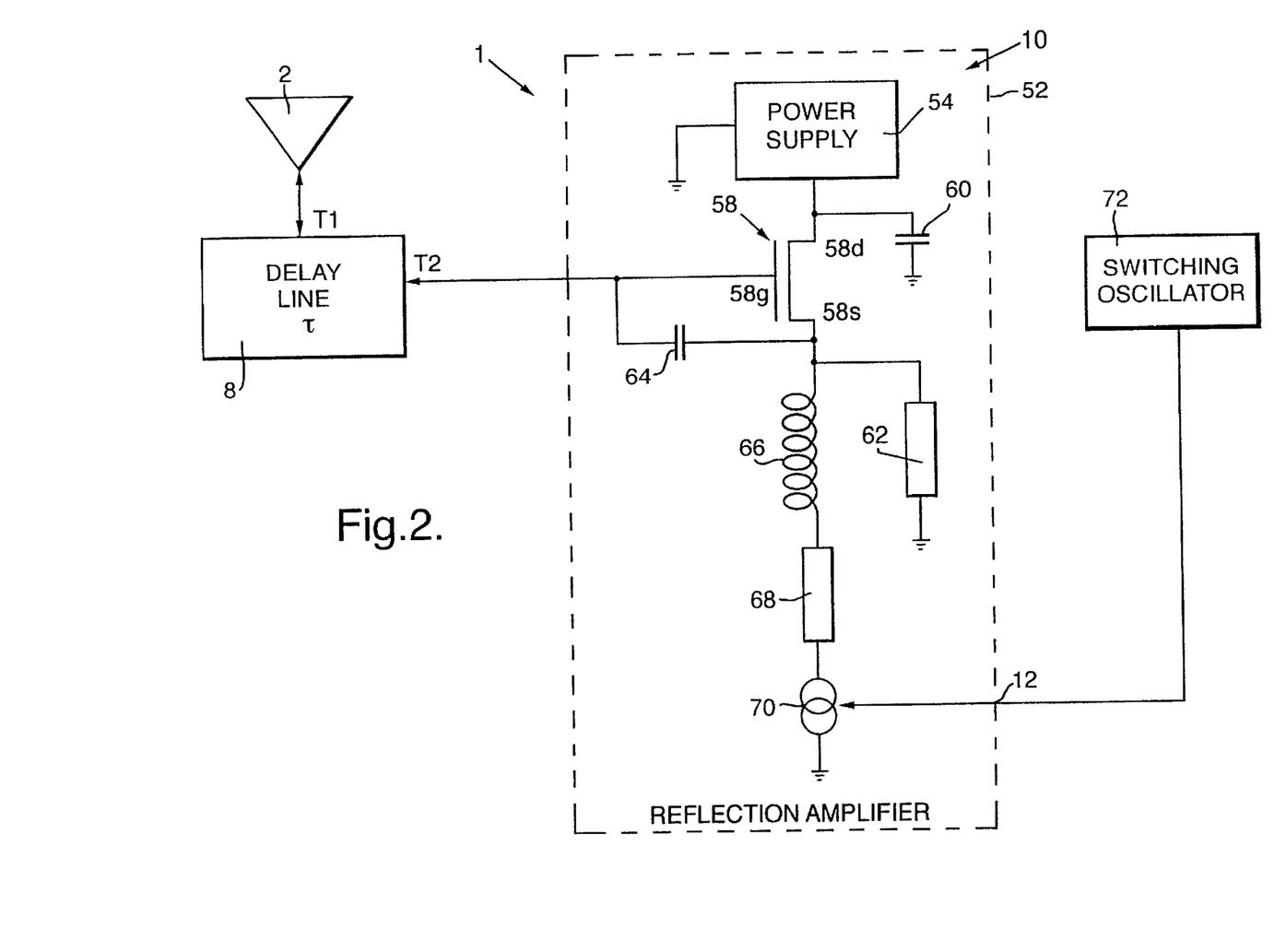
FIG. 2 is a schematic of a reflection amplifier incorporated into the reflector circuit shown in FIG. 1.

Referring now to FIG. 2, there is shown the reflection amplifier 10 in greater detail contained within a dotted line 52. The amplifier 10 incorporates a power supply 54, a silicon or GaAs transistor 58, a capacitor 60 and a resistor 62 forming a termination network for the transistor 58, a feedback capacitor 64, an inductor 66 and a resistor 68 forming a bias network for the transistor 58, and a controllable current source 70.

The delay line 8 incorporates two signal connection ports T1, T2; the port T1 is connected to the antenna 2, and the port T2 is connected to a gate electrode 58g of the transistor 58 and to a first terminal of the capacitor 64. The power supply 54 is connected to a drain electrode 58d of the transistor 58 and also to a first terminal of the capacitor 60; a second terminal of the capacitor 60 is connected to a signal ground. The capacitor 64 provides a second terminal which is connected to a source electrode 58s, to a first terminal of the resistor 62 whose other terminal is grounded, and through the inductor 66 and the resistor 68 in series to the source 70. A switching oscillator 72 is also connected to the source 70 to provide a square wave switching signal thereto.

Operation of the reflection amplifier 10 is controlled by the square wave signal generated in the switching oscillator 72 which is applied to an input 12 of the amplifier 10; the signal alternately switches the amplifier 10 between relatively more reflecting and relatively less reflecting states by controlling the drain/source current of the transistor 58 such that it alternately operates within different regions of its current/voltage characteristics. It will be appreciated by those skilled in the art that other methods of controlling the amplifier 10 can be used, for example by varying a supply potential provided by the supply 54.

During operation of the circuit 1, reflective amplification provided by the reflection amplifier 10 is activated and de-activated in a switched fashion with a period of 4τ where τ is a time period required for a signal applied to the delay line 8 to propagate therethrough as a wave and then be reconstituted as a signal for output therefrom. Introducing a time delay of duration τ for signal propagation between the antenna 2 and the amplifier 10 ensures that any signal which is reflected by the antenna 2 towards the amplifier 10 on account of imperfect impedance matching at the antenna 2 arrives back at the amplifier 10 when it is in a relatively less reflecting state thereby counteracting spontaneous oscillation within the circuit 1.

The output radiation 6 comprises a number of radiation components, namely a carrier component whose frequency is determined by the frequency of the illuminating radiation 4, together with sideband radiation components whose frequencies are offset from the frequency of the illuminating radiation 4 by a frequency difference $f_{sideband}$ determined by the period τ according to Equation 1:

$$f_{sideband} = \frac{n}{4\tau} \qquad \text{Eq. 1}$$

where n is an integer. Components of relatively greatest amplitude occur for n=1.

Although the antenna 2 and the reflection amplifier 10 are arranged to be mutually impedance matched as closely as possible, a small proportion of the reflected signal will be reflected by the antenna 2 as a re-reflected signal back through the delay line 8 to the reflection amplifier 10.

However, the reflection amplifier 10 is still in its relatively non-reflecting state when the re-reflected signal reaches the reflection amplifier 10 at a time t=3τ and the amplifier 10 will remain in this state until a time t=4τ. Thus, assuming that the reflection amplifier 10 when in its relatively non-reflecting state is properly impedance matched to the delay line 8, unwanted re-reflected signals from the antenna 2 will be incident on the reflection amplifier 10 only while it is in its relatively non-reflecting state.

This mode of operation of the circuit 1 ensures that relatively high levels of reflection gain approaching +30 dB can be obtained irrespective of antenna 2 impedance matching with associated reduced likelihood of spontaneous self-oscillation arising within the circuit 1.

When the circuit 1 simultaneously receives several components of radiation in the illuminating radiation 4, one or more of which have sufficient power to cause overload in the circuit 1 if it were providing its unattenuated nominal amplification, the delay line 8 will selectively provide attenuation at frequencies of those overloading components to counteract their overloading effect on the amplifier 10. It is advantageous to avoid overload because non-linear signal mixing can occur within the amplifier 10 giving rise to a complex and potentially confusing spectrum of radiation components emitted from the antenna 2, namely giving rise to intermodulation artefacts. As described in the foregoing, the delay line 8 provides such attenuation selectively when the power of a radiation component received by the circuit I exceeds a threshold power level as determined by characteristics of the delay line 8.

This characteristic is important when the reflector circuit 1 is, for example, incorporated into a marine buoy where it may be interrogated simultaneously from several marine vessels at varying distances therefrom. In order to avoid overload in the circuit 1 and thereby counteract a situation where one or more of the vessels fail to recognise the buoy, the delay line is by virtue of its selective attenuation function effective to reduce overload, thereby ensuring that the buoy is detectable by all the vessels, irrespective of whether or not they simultaneously interrogate it.

When the circuit 1 simultaneously receives several components of radiation in the illuminating radiation 4, one or more of which have sufficient power to exceed the threshold power level if it were providing its unattenuated nominal amplification but not cause overload, the delay line 8 will also selectively provide attenuation of these stronger components thereby providing the circuit 1 with a selective signal compression characteristic. This function is useful when the circuit 1 is, for example, interrogated from relatively distant and closer sources where only weaker output radiation is required for responding to the closer sources and stronger output radiation is required for the distant sources.

Transmission losses through the delay line 8 must be less than 7.5 dB when the reflection amplifier 10 provides a reflection gain of 25 dB to achieve a magnitude of more than 0 dB for sideband radiation components included in the emitted output radiation 6.

Figure 3:
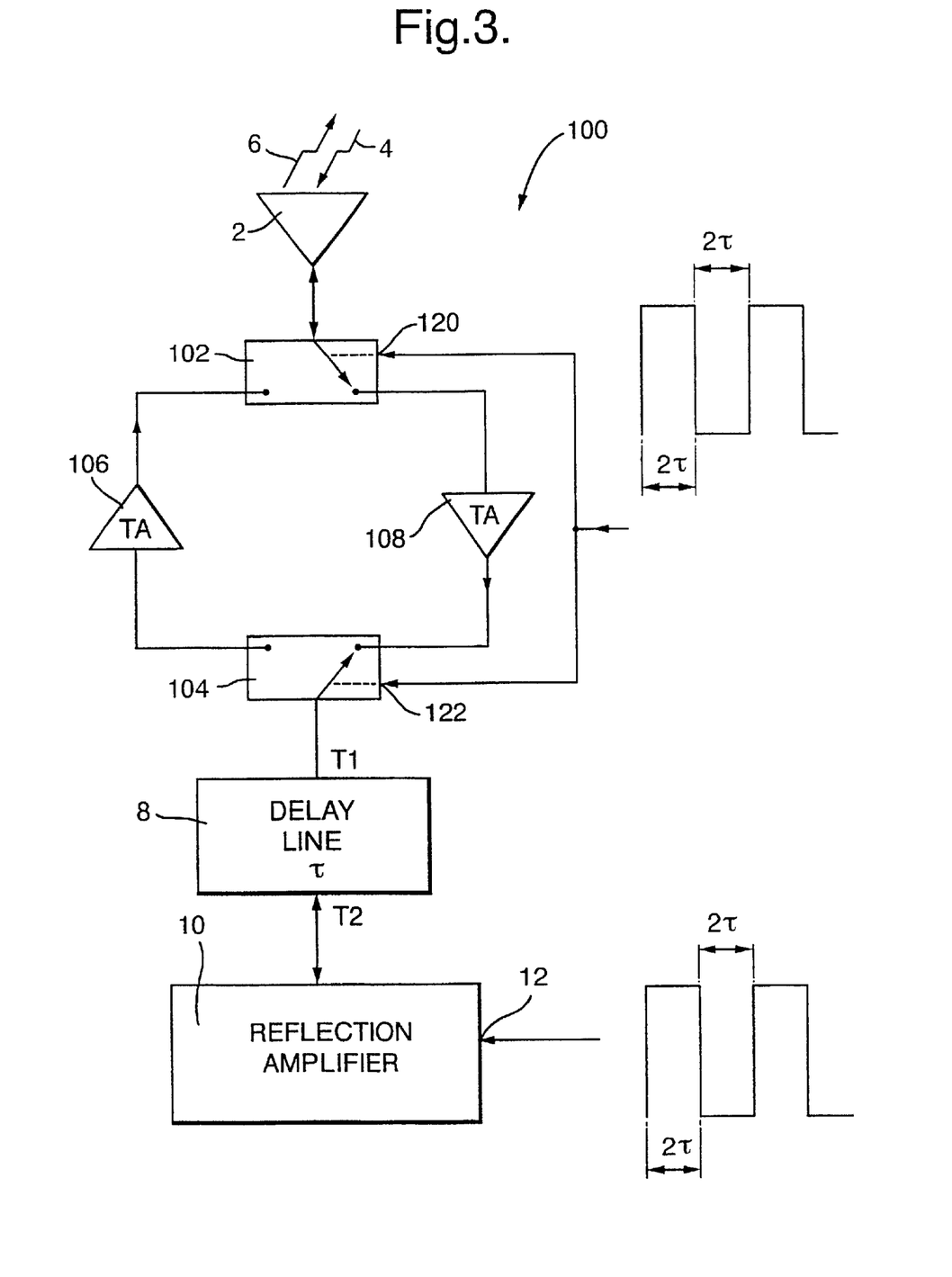
FIG. 3 is a schematic of a reflector circuit in accordance with a second embodiment of the invention.

A reflector circuit configuration which is less dependant on delay line loss is shown in FIG. 3 and indicated by 100. The circuit 100 incorporates the circuit 1 and additionally includes a pair of switches 102, 104 and a pair of transmission amplifiers 106, 108. The switches 102, 104 and the amplifiers 106, 108 are inserted between the antenna 2 and the delay line 8 of the circuit 1 shown in FIG. 1. The switches 102, 104 are controlled by respective control inputs 120, 122 to which a square wave signal, having a period of 4τ, is applied; the square wave signal is synchronised to that applied to control the amplifier 10. The two switches 102, 104 define two signal paths, namely first and second signal paths, between the antenna 2 and the delay line 8 in the circuit 100. Operation of the circuit 100 is essentially the same as that described above for the circuit 1 in FIG. 1. In the circuit 100, the effect of the delay line loss is eliminated because:

(i) the input signal generated at the antenna 2 in response to it receiving the illuminating radiation 4 is amplified by the transmission amplifier 108 before being applied to the delay line 8; and (ii) a reflected and amplified signal from the reflection amplifier 10 having passed through the delay line 8 then passes down the second path where it is amplified by the transmission amplifier 106 before being applied to the antenna 2 for emission as radiation therefrom.

Figure 4:
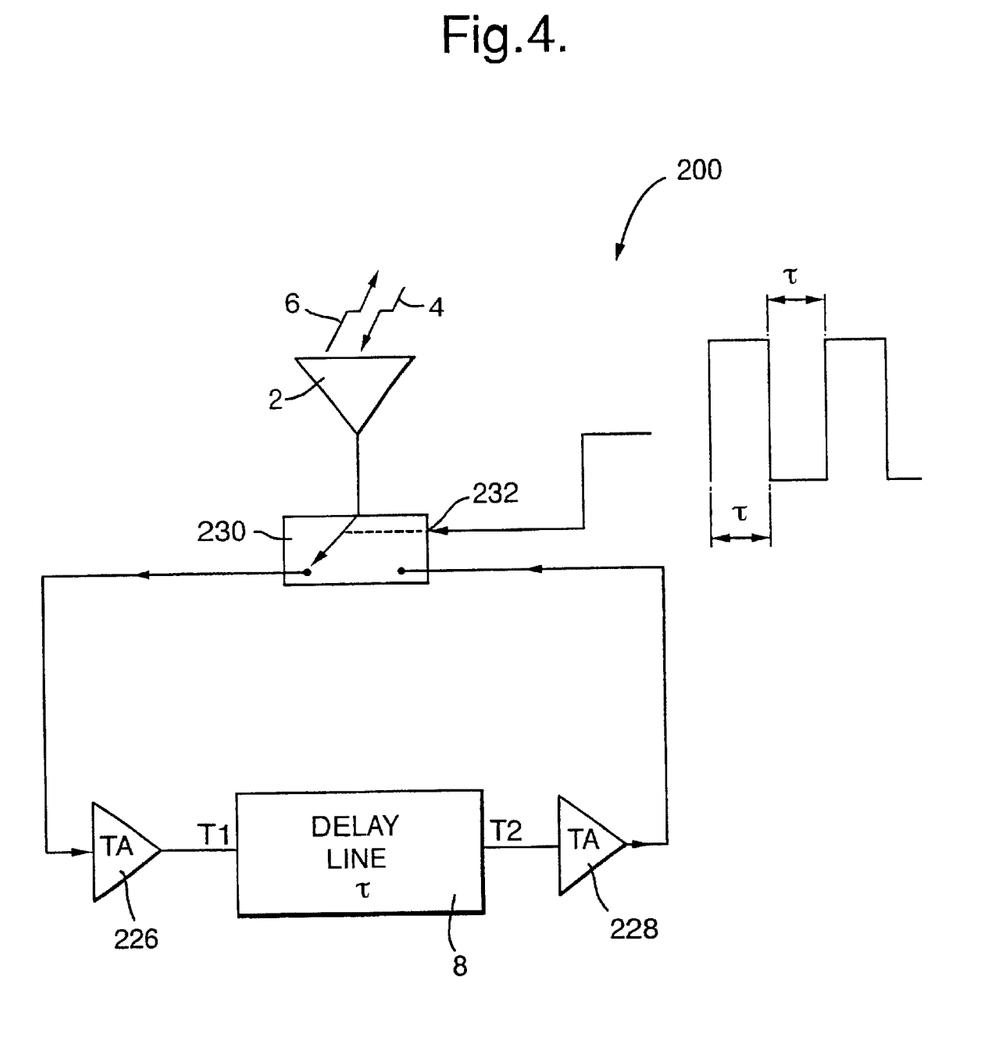
FIG. 4 is a schematic of a reflector circuit in accordance with a third embodiment of the invention.

Referring to FIG. 4, a further reflector circuit in accordance with the invention is indicated by 200. The circuit 200 uses two transmission amplifiers 226, 228 rather than a reflection amplifier 10. The circuit 200 comprises a first transmission amplifier 226, the delay line 8 and a second transmission amplifier 228 which are connected in series across a switch 230 which includes a wiper connected to the antenna 2. The switch 230 is operated by applying a square wave signal to its input 232, the signal having a period which is equal to twice the period τ for a signal applied to the T1 input of the delay line 8 to propagate to the T2 output thereof. With the switch 230 in a position shown in FIG. 4, the input signal generated in response to receiving the illuminating radiation 4 at the antenna 2 passes at a time t=0 therefrom through the first amplifier 226 to be amplified therein after which it passes into the delay line 8. After a time t=τ, the delay line 8 is "full" and the switch 230 is then switched by the square wave signal to its alternate position; the delay line 8 then contains a stored signal, namely a portion of the input signal after amplification. The stored signal when output from the delay line 8 is then amplified by the second amplifier 228 and passes through the switch 230 to be emitted from the antenna 2 as the output radiation 6. The stored signal is emitted from t=τ until t=2τ after which time all of the signal stored in the delay line 8 will have reached the antenna 2; the switch 230 is then switched back to its original position and the process described above repeated.

Any signal that is reflected from the antenna 2 on account of its imperfect impedance match cannot reach the first amplifier 226 because the switch 230 in operation connects the antenna 2 to the output of the second amplifier 228. Thus, any reflected signal from the antenna 2 is dissipated in the reverse isolation/output match of the transmission amplifier 228. As a consequence of cyclically breaking a loop comprising the switch 230, the amplifiers 226, 228 and the delay line 8 as described above, conditions for spontaneous closed loop oscillation within the circuit 200 are eliminated. As a consequence, provided that adequate isolation can be achieved by the switch 230, it is possible to use high levels of gain independently of impedance matching achieved at the antenna 2 without fear of spontaneous oscillation. For example, practical tests have shown that, if each of the amplifiers 226, 228 have respective gains of 25 dB, the delay line 8 has an insertion loss of 10 dB and the antenna 2 has a return loss of 0 dB, sideband components in the output radiation 6 will be at a level of +30 dB above the illuminating radiation 4 carrier component magnitude for an operating frequency range of 1 to 4 GHz. This provides the circuit 200 with a considerably extended operating range compared to prior art reflection circuits.

In the circuit 200, incorporation of the delay line 8 ensures that it provides a frequency selective attenuation characteristic for counteracting overload and providing compression in a similar manner to the circuit 1.

Figure 5:
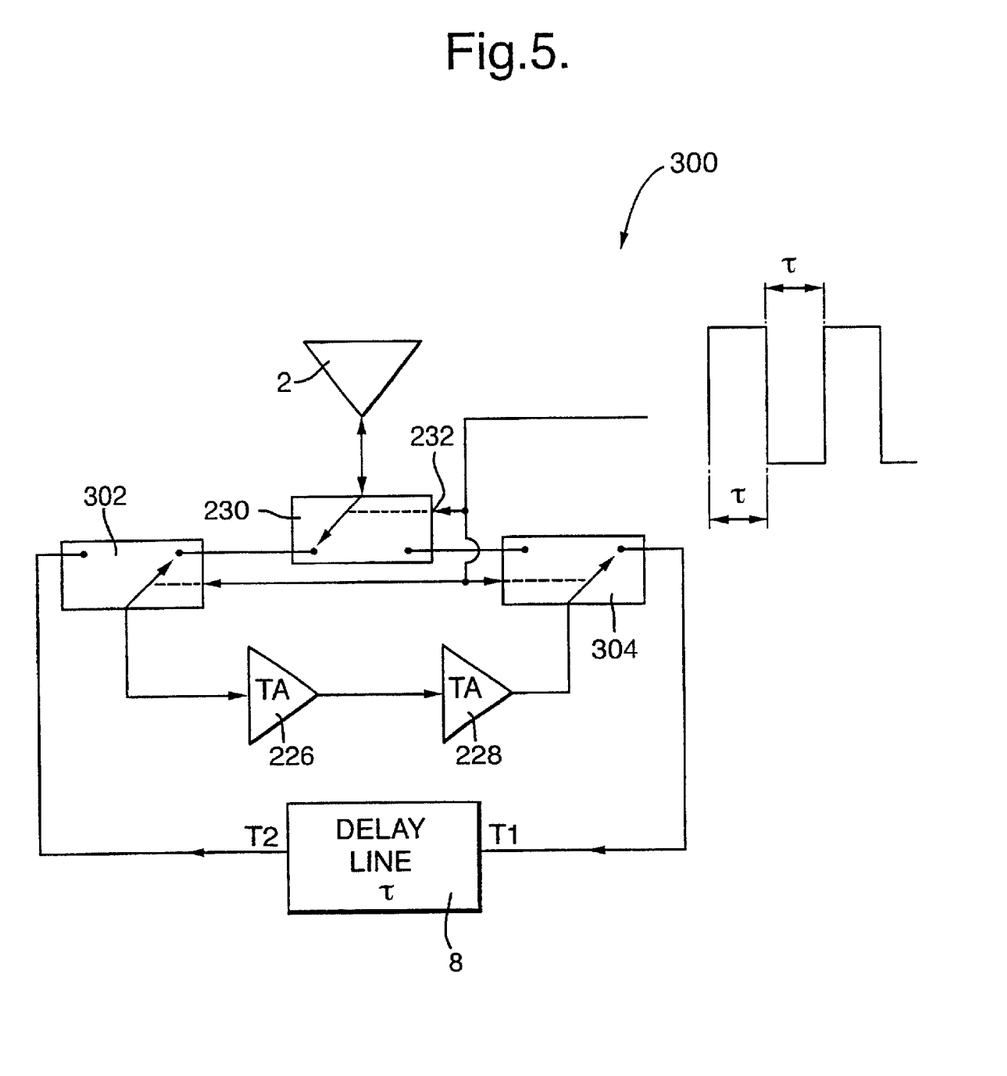
FIG. 5 is a schematic of a reflector circuit in accordance with a fourth embodiment of the invention.

Referring to FIG. 5, there is shown a further reflector circuit according to the invention indicated by 300. It derives from the circuit 200 and includes two further switches 302, 304 which are operated with an associated square wave controlling signal whose period is twice that of the delay line time τ. In the circuit 300, an input signal generated in response to receiving the illuminating radiation 4 is amplified by the two transmission amplifiers 226, 228 and then passes to the delay line 8 at time t=0. When the amplified input signal emerges from the delay line 8 at a time t=τ as a delayed signal, the switches 230,302, 304 change state and the delayed signal passes through the transmission amplifier 226, 228 a second time before being emitted by the antenna 2 as the output radiation 6. It will be appreciated that in this arrangement, amplification in the circuit 300 can be doubled compared to that in the circuit 200 by inclusion of the two switches 302, 304.

It will be appreciated that, in each of the embodiments of the invention described in the foregoing, there is incorporated an antenna, a delay line and an amplifier assembly. The amplifier assembly incorporates one or more of a reflection amplifier and a transmission amplifier switched to counteract occurrence of spontaneous oscillations therein. In each embodiment, the delay line functions as a storage element and selects a portion of the input signal generated in response to received illuminating radiation, the portion having a periodic time duration of τ. The delay line, namely delay line 8, simultaneously provides its frequency selective limiting function as described above. Whilst the delay line 8 operating as a MWDL is a convenient way of providing this function, any signal storing device or assembly with similar characteristic for storing a portion of the input signal could be used. An alternative signal storing device could comprise a surface acoustic wave delay line (SAW) coupled to associated electronic signal compression circuits providing a selective limiting function electronically; such circuits will be considerably more complex than a MWDL. This will be described in more detail later.

In the embodiments of the invention described above, the circuits 1, 100, 200, 300 can be further modified to apply data modulation so that the output radiation 6 becomes modulated with data. Such modulation can comprise one or more of amplitude, frequency and phase modulation. For each type of modulation employed, the output radiation 6 may be "on-off keyed" such that associated sidebands arising from the additional modulation will occur at a frequency offset from the frequency of the illuminating radiation 4 as provided by Equation 2 and 3:

$$f_{sideband} = \frac{1}{4\tau} \qquad \text{Eq. 2}$$

$$f_{sideband} = \frac{1}{2\tau} \qquad \text{Eq. 3}$$

where Eq. 2 and Eq. 3 pertain to amplitude and frequency/ phase modulation respectively. It will be appreciated that the power of the sidebands as provided by Eq. 1 for non data-modulated operation may be reduced when the modulation is applied. The level of this reduction will be dependent on the modulation technique used and the data rate being transmitted.

Data modulation described above can also include modulation using an analogue information bearing signal, for example an analogue pilot tone, specific to the reflector circuit, thereby enabling an interrogating source to identify which category of reflector circuit is providing a response thereto by decoding the data modulation applied to radiation received thereat.

Data modulation can be applied using an additional modulation circuit connected to the reflecting circuit 1, 100, 200, 300 for modulating bias currents in one or more of the reflection amplifier 10 and the transmission amplifiers 106, 108, 226, 228. For example, modulation may be applied to periodically disable the switching oscillator 70 so that the reflection amplifier 10 is in a relatively non-reflecting state for time periods which are integer multiples of the time period $4\tau$, namely the cycle period of output from the switching oscillator 70.

A reflector circuit according to the invention provides a significant increase in reflection gain whilst also providing frequency selective filtration, thereby making it ideally suited for use in pseudo-passive transponder tags. As a consequence, it is possible to operate such a tag over much greater distances for a given level of illuminating radiation carrier power than has been hitherto possible. Moreover, its frequency selective properties are capable of counteracting overload in the tag when interrogated simultaneously by closer and remoter interrogating sources operating at mutually different frequencies and providing widely different illuminating radiation powers at the tag.

Due to its very high reflection gain, for example approaching +30 dB, the circuits 1, 100, 200 300 present a very large radar cross section making them ideally suited for use as radar chaff or radar marker beacons. In such applications, the time delay $\tau$ is selected to be as short as possible to ensure that the sidebands are displaced from the carrier frequency of illuminating radiation applied thereto as far as possible or at least sufficiently far such that they lie outside the bandwidth of a radar system providing the illuminating radiation.

It will be appreciated by those skilled in the art that variations can be made to the circuits 1, 100, 200, 300 described in the foregoing without departing from the scope of the invention. Thus, whilst the delay line 8 is implemented as a MWDL in the embodiments described above, other types of delay line can be used which provide equivalent functional characteristics compared to the MWDL. For example, as described in the foregoing, other types of delay line can incorporate an array of bandpass filters supplied with an input signal and each provided with its own associated amplitude compression facilities. The filters may have their outputs summed into a surface acoustic wave (SAW) delay line, a length of coaxial cable acting as a delay line or an optical delay line for providing a delayed output signal therefrom. Such alternative types of delay line with associated filters are more complex than MWDL devices described above. In the case of the optical delay line referred to above, an input electrical signal applied thereto would need to be converted therein to an optical signal using a light source to provide corresponding optical radiation which would propagate along a light guiding path and would then be converted back to an electrical signal at an output of the optical delay line. Although a SAW delay line is compact and can provide a relatively large delay time $\tau$ approaching several $\mu$sec, it can only operate over a relatively low frequency bandwidth. Whilst such a device is ideally suited for use in transponder applications, operation over a large bandwidth of several GHz is required in the case of radar chaff. Accordingly, other devices can be used such as bulk acoustic wave devices which have a large bandwidth. MWDLs are however particularly advantageous because they have the benefit of a broad bandwidth and lower loss for operating frequencies up to 6 GHz.

Furthermore, it will be appreciated that a reflector circuit according to the invention could take many forms including one or more amplifying stages and one or more switches. It is further possible to use two separate antennae elements, a first antenna element for receiving the illuminating radiation 4 and a second antenna element for emitting the output radiation 6. For example in the embodiment shown in FIG. 3, the first antenna element could be connected directly to the input of the amplifier 108 and the second antenna element could be connected to the output of the amplifier 106 to provide a modified circuit. Such a modified circuit eliminates the need for the switch 102, thereby reducing switching losses of the circuit 100. In the circuit 200, the first antenna element is preferably connected to the amplifier 226 via the switch 230 and the second antenna element is connected directly to the output of the amplifier 228. It is preferable to locate the switch on the receiving side of the circuit 200 before the input signal is amplified as this enables a lower power handling switch to be used.

Finally in the embodiment shown in FIG. 5, the switch 230 can be replaced with separate antennae elements connected directly to the switches 302, 304. In all the embodiments described above which use two antennae elements, switches employed therein operate to prevent any signal which is cross-coupled from the second antenna element to the first antennae element from causing unwanted spontaneous circuit oscillation. This reduction in circuit oscillation arises because the first element is effectively isolated from the input of the circuit whenever the second element is emitting radiation and this enables the two elements to be placed in closer physical proximity than would otherwise be practicable.

What is claimed is:

1. A reflector circuit for receiving illuminating radiation having components with respective magnitudes, and for emitting corresponding amplified output radiation, the circuit comprising:
   a) an antenna assembly for receiving the illuminating radiation and for providing a corresponding received signal; and
   b) processing means for amplifying and storing a portion of the received signal for a period of time for use in generating a corresponding output signal for emission from the antenna assembly as the amplified output radiation, the processing means being arranged for providing frequency selective amplification dependent, for each component present in the illuminating radiation, on the respective magnitude of that component.

2. The circuit according to claim 1, wherein the processing means is arranged for providing amplification which selectively and progressively reduces in response to increased magnitude of the components in the illuminating radiation.

3. The circuit according to claim 1, wherein the processing means incorporates at least one of a reflection amplifier and a transmission amplifier for amplifying the portion of the received signal.

4. The circuit according to claim 3, wherein the processing means incorporates gain controlling means for switching the reflection amplifier alternately between a relatively more reflecting state and a relatively less reflecting state, thereby operating to counteract closed-loop oscillation within the circuit.

5. The circuit according to claim 4, wherein the reflection amplifier includes a transistor configured by means of a feedback arrangement to operate within different portions of the transistor's current/voltage characteristics to operate in the relatively more reflecting state and the relatively less reflecting state.

6. The circuit according to claim 4, wherein the storing means is arranged for storing a signal within it for a period $\tau$ and then output it, and wherein the gain controlling means is arranged for operating at a rate related to an integer number of the period $\tau$.

7. The circuit according to claim 1, wherein the processing means incorporates storing means for storing the portion of the received signal for use in generating the output signal, the storing means incorporating a magnetostatic wave device arranged for providing a frequency selective response.

8. The circuit according to claim 7, wherein the magnetostatic wave device is operative for providing a signal propagation path through an epitaxial yttrium iron garnet (YIG) magnetic film having a thickness in a range of 10 $\mu$m to 100 $\mu$m for storing the portion of the received signal and for providing the frequency selective response.

9. The circuit according to claim 7, wherein the processing means incorporates a reflection amplifier for amplifying the portion of the received signal, and wherein the storing means is connected in a signal path between the reflection amplifier and the antenna assembly.

10. The circuit according to claim 1, wherein the processing means incorporates modulating means for applying data modulation to the portion of the received signal, thereby modulating the amplified output radiation with data.

11. Radar chaff including a reflector circuit for receiving illuminating radiation having components with respective magnitudes, and for emitting corresponding amplified output radiation, the circuit comprising:
    a) an antenna assembly for receiving the illuminating radiation and for providing a corresponding received signal; and
    b) processing means for amplifying and storing a portion of the received signal for a period of time for use in generating a corresponding output signal for emission from the antenna assembly as the amplified output radiation, the processing means being arranged for providing frequency selective amplification dependent, for each component present in the illuminating radiation, on the respective magnitude of that component.

* * * * *